United States Patent [19]

Pluim

[11] Patent Number: 5,725,749
[45] Date of Patent: Mar. 10, 1998

[54] PROCESS FOR THE SEPARATION OF LACTULOSE

[75] Inventor: Hendrik Pluim, Weesp, Netherlands

[73] Assignee: Duphar International Research B.V., Weesp, Netherlands

[21] Appl. No.: 740,398

[22] Filed: Oct. 29, 1996

Related U.S. Application Data

[63] Continuation of Ser. No. 498,899, Jul. 6, 1995, abandoned.

[30] Foreign Application Priority Data

Jul. 11, 1994 [EP] European Pat. Off. ............. 94201997

[51] Int. Cl.$^6$ .................... B01D 61/44; B01D 61/48
[52] U.S. Cl. ............... 204/534; 204/537; 204/540; 204/541; 204/631
[58] Field of Search ............... 204/534, 537, 204/540, 541, 631

[56] References Cited

U.S. PATENT DOCUMENTS

| | | | |
|---|---|---|---|
| 4,180,451 | 12/1979 | McRae | 204/301 |
| 4,299,677 | 11/1981 | Venkatasub-Ramanian et al. | 204/180 P |
| 4,504,373 | 3/1985 | Mani et al. | 204/361 |
| 4,871,431 | 10/1989 | Parsi | 204/631 |
| 5,071,530 | 12/1991 | Krambholz et al. | 204/182.3 |
| 5,244,553 | 9/1993 | Goldstein | 204/182.4 |

FOREIGN PATENT DOCUMENTS

| | | |
|---|---|---|
| 2043019 | 11/1991 | Canada. |
| 0375046 | 6/1990 | European Pat. Off.. |
| 0458389 | 11/1991 | European Pat. Off.. |

*Primary Examiner*—Arun S. Phasge
*Attorney, Agent, or Firm*—Watson Cole Stevens Davis, P.L.L.C.

[57] ABSTRACT

The invention relates to a process for the separation of lactulose from a mixture of lactulose and lactose in the presence of a weak acid capable of reversibly forming a complex with lactulose, by using an electrodialysis equipment including an anode and a cathode compartment separated by a plurality of parallel compartments comprising alternating diluate and concentrate compartments, wherein adjacent compartments are separated from each other by permselective membranes; which process is characterized by:

(a) continuously passing an alkaline aqueous solution of lactulose, lactose and said complex forming weak acid through the diluate compartments, each diluate compartment being bound by a bipolar membrane at its lateral side facing the cathode and at its opposite lateral side by an anion exchange membrane, separating said compartment from its adjacent concentrate compartment;

(b) continuously passing a carrier fluid through the concentrate compartments, each concentrate compartment being bound at its lateral side facing the anode by a bipolar membrane and at its opposite lateral side by said anion exchange membrane; and (c) maintaining an electric potential between anode and cathode which transports complexed lactulose preferentially to lactose from said diluate compartments to said concentrate compartments, in order to enrich the carrier fluid with complexed lactulose. The invention further relates to an electrodialysis equipment for use in the above process.

7 Claims, 4 Drawing Sheets

PROCESS FOR THE SEPARATION OF LACTULOSE

This application is a continuation of application Ser. No. 08/498,899, filed Jul. 6, 1995, now abandoned.

The present invention relates to a process for the separation of lactulose from a mixture of lactulose and lactose in the presence of a weak acid capable of reversibly forming a complex with lactulose, by using an electrodialysis equipment including an anode and a cathode compartment separated by a plurality of parallel compartments comprising alternating diluate and concentrate compartments, wherein adjacent compartments are separated from each other by permselective membranes.

Such a process is described in EP-A-0458389. As described in Example 3 of this published patent application, a mixture of lactulose, lactose and boric acid is passed through compartment I, the so-called diluate compartment, of an electrodialysis cell. The diluate compartment is separated from the adjacent concentrate compartment II by a cation exchange type membrane. In the concentrate compartment the product lactulose, i.e. the compound to be concentrated, is collected during electrodialysis. The anode and cathode compartments are situated at either side of the diluate and concentrate compartments and are separated from the latter compartments by cation-selective membranes. The use of bipolar membranes, in addition to cation-selective and anion-selective membranes, is mentioned in a suggesting manner. In the same manner the combination of a number of electrodialysis cells to an electrodialysis stack is mentioned.

An electrodialysis stack is described in U.S. Pat. No. 5,244,553 for use in a method for recovering acid, e.g. sulfuric acid or hydrochloric acid, from an acid-sugar hydrolyzate, e.g. hydrolyzed cellulose-containing material. This electrodialysis stack consists of a plurality of alternating concentrate and diluate compartments, situated between an anode-cathode pair and alternately separated from each other by cationic and anionic semi-permeable membranes.

The application of electrodialysis in the separation of lactulose from a crude reaction mixture from the lactose conversion is a powerful tool in obtaining this pharmaceutical product in a pure condition. It has been observed, however, that the use of a electrodialysis cell for the separation of lactulose from a mixture of lactose and lactulose, as described in the above EP-A-0458389, is not completely satisfactory. The lactulose concentration in the mixture to be subjected to electrodialysis should be sufficiently large to be able to successfully use this electrodialysis technique in the separation of lactulose. This means that the conversion of lactose to lactulose in the presence of boric acid and caustic alkali should be continued to such an extent, that the formation of undesired side products cannot always be avoided. In addition, the total content of dry substance should be sufficiently high to obtain a concentrate of an acceptible dry substance concentration after the electrodialytic step.

It is the objective of the present invention to use an improved electrodialysis equipment, so that a diluted mixture—originated from a moderate lactose → lactulose conversion and a diluate low in dry substance concentration—can successfully be used in the separation of lactulose according to the process as described in the opening paragraph.

This objective can be achieved by using electrodialysis in a continuous process for the production of lactulose. More in particular, the process for the separation of lactulose by using the electrodialysis technique is characterized according to the present invention by:

(a) continuously passing an alkaline aqueous solution of lactulose, lactose and said complex forming weak acid through the diluate compartments, each diluate compartment being bound by a bipolar membrane at its lateral side facing the cathode and at its opposite lateral side by an anion exchange membrane, separating said compartment from its adjacent concentrate compartment, with the proviso that the bipolar membrane separating the cathode compartment and adjacent diluate compartment can optionally be replaced by an anion exchange membrane;

(b) continuously passing a carrier fluid through the concentrate compartments, each concentrate compartment being bound at its lateral side facing the anode by a bipolar membrane and at its opposite lateral side by said anion exchange membrane, with the proviso that the bipolar membrane separating the anode compartment and adjacent concentrate compartment can optionally be replaced by a cation exchange membrane; and (c) maintaining an electric potential between anode and cathode which transports complexed lactulose preferentially to lactose from said diluate compartments to said concentrate compartments, in order to enrich the carrier fluid with complexed lactulose.

Bipolar membranes are membranes through which basically only protons and hydroxyl ions can be transported.

Figure 1:
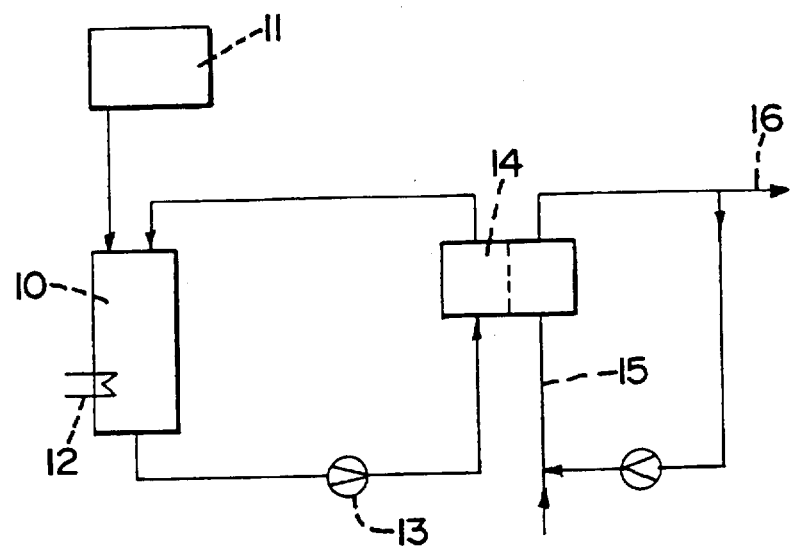
FIG. 1 is a schematic representation of a continuous electrodialytic process according to the invention.

Surprisingly it has been found, that in the process of the present invention the lactulose concentration in the concentrate, i.e. in the carrier fluid passing through the concentrate compartments, can increase to 20 to 30%, starting from a very diluted diluate (i.e. the alkaline aqueous solution passing through the diluate compartments). A high dilution of said diluate suppresses the formation of side products, as has been demonstrated. The high efficiency of the lactulose transport through the membranes enables the use of such a highly diluted diluate. Further, in the process for the separation of lactulose according to the invention, use can be made of a reaction mixture from a moderate conversion of lactose to lactulose. Such a moderate conversion has also a beneficial effect with regard to the appearance of undesired side products, in that the formation of such side products is efficaciously suppressed. Nevertheless, if undesired side products are formed, these are transported to the concentrate and do not adversily accumulate in the circulating diluate. Therefore a real continuous process can be realized in this manner.

It has been observed, that, different from the prior art, even at high pH, e.g. in the range of approx. 9 to 10, and at elevated temperature (approx. 60–70°C.), which reaction conditions are maintained in the reaction vessel during the lactose → lactulose conversion, a favourable lactulose: lactose ratio can be reached for the electrodialytic process of the invention. The concentrated lactulose solution obtained by performing the process of the present invention can be used as such, i.e. without elaborate purification, for preparing pure lactulose via a simple subsequent chromatographic purification, to be performed in the presence of said complex forming weak acid. It will be obvious that the simplicity of the continuous electrodialytic process of the invention, wherein preceding and subsequent processing is considerably reduced, is economical in both chemicals consumption and equipment.

In the process of the present invention an alkaline aqueous solution of the diluate is continuously passed through the diluate compartments, which are bound at one lateral side by anion exchange membranes. In case contact between the anion exchange membranes and caustic alkali is considered to be undesirable, the process for the separation of lactulose according to the present invention can slightly be modified within the scope of the inventive idea. According to this embodiment of the invention, the continuous electrolytic process for the separation of lactulose is carried out in an electrolysis equipment, including in addition a plurality of auxiliary compartments parallel situated adjacent the diluate compartments, through which auxiliary compartments an aqueous caustic alkali stream is passed continuously, each auxiliary compartment being bound by a bipolar membrane at its lateral side facing the cathode and at its opposite lateral side by a cation exchange membrane, separating this auxiliary compartment from its adjacent diluate compartment, with the proviso that the bipolar membrane separating the cathode compartment and adjacent auxiliary compartment can optionally be replaced by an anion exchange membrane. By using the above-defined electrodialysis equipment, the aqueous caustic alkali is passed through the auxiliary compartments which are not bound, if desired with the exception of the optional anion exchange membrane separating the cathode compartment and adjacent auxiliary compartment, at their lateral sides by anion exchange membranes. In this embodiment the aqueous caustic alkali is obtained in a separate stream and can be recycled directly to the reactor, where the lactose → lactulose conversion takes place.

The lactulose concentration in the concentrate and the lactulose:lactose ratio in the concentrate can be influenced by the conditions of the starting alkaline aqueous solution of lactulose, lactose and complex forming weak acid, in particular the pH value and the temperature thereof. It has been demonstrated, that a pH value of at least 8.8, preferably of approximately 10, and a temperature of approximately 60°–70°C. benefits both the absolute and the relative lactulose concentration in the concentrate. It is a favourable aspect of using the same conditions as during the lactose → lactulose conversion, that this conversion is not discontinued during the circulation of the process stream through the electrodialysis equipment. Therefore, the conversion reaction needs not be discontinued, no storage is needed and the equipment is optimally used.

As mentioned above, the best results as to the purity of the product lactulose in the concentrate are obtained by using a solution of lactulose, lactose and said complex forming weak acid which passes the diluate compartments, resulting from an approx. 20 to 40% lactose → lactulose conversion. A further improvement of the purity of the product lactulose in the product can be obtained by using a solution, having a very low dry substance concentration of between 0.5 and 10%.

If desired, the diluate compartments are provided with anion exchange material, in particular special anion exchange resins as described in the above EP-A-0458389. Such a provision may improve the selective transport of the product lactulose from the diluate compartments to the concentrate compartments. Examples of weak acids, capable of reversibly forming a complex with lactulose, are inorganic weak acids such as boric acid, germanic acid, silicic acid, aluminates, plumbates and stannates. Because of its availability and its complex forming properties boric acid is preferred.

The invention further relates to an electrodialysis equipment suitable for use in the process as defined hereinbefore, including an anode and a cathode compartment separated by a plurality of parallel compartments comprising alternating diluate and concentrate compartments, wherein adjacent compartments are separated from each other by permselective membranes, said equipment being characterized in that:

(i) each diluate compartment is bound by a bipolar membrane at its lateral side facing the cathode and at its opposite lateral side by an anion exchange membrane, separating said compartment from its adjacent concentrate compartment, with the proviso that the bipolar membrane separating the cathode compartment and adjacent diluate compartment can optionally be replaced by an anion exchange membrane; and (ii) each concentrate compartment is bound at its lateral side facing the anode by a bipolar membrane and at its opposite lateral side by said anion exchange membrane, with the proviso that the bipolar membrane separating the anode compartment and adjacent concentrate compartment can optionally be replaced by a cation exchange membrane.

In a slightly modified embodiment, the electrodialysis equipment according to the present invention includes a plurality of auxiliary compartments parallel situated adjacent the diluate compartments, each auxiliary compartment being bound by a bipolar membrane at its lateral side facing the cathode and at its opposite lateral side by a cation exchange membrane, separating this auxiliary compartment from its adjacent diluate compartment, with the proviso that the bipolar membrane separating the cathode compartment and adjacent auxiliary compartment can optionally be replaced by an anion exchange membrane.

The present invention is illustrated in greater detail by the following specific Examples.

Example I

Separation of lactulose in an electrodialysis equipment using bicompartment cells.

The principle of the continuous electrodialytic process is shown schematically in FIG. 1.

In this Figure the reactor, wherein the conversion lactose → lactulose takes place, is denoted with 10. This reactor is continuously fed with a lactose-boric acid mixture from reservoir 11. The reaction is maintained at a temperature of 60° C. by heat exchange (12). Sufficient caustic alkali (NaOH) is present in the reactor to keep the aqueous reaction mixture at a pH of approximately 10. The reaction mixture is recirculated by means of a pump 13 through an electrodialysis stack 14. The sketch (14) gives an outline (pars pro toto) of a stack, consisting of a plurality of bicompartment cells situated in parallel arrangement between a cation-anion pair. It will be obvious that the reaction mixture, the so-called diluate, is continuously passed through all diluate compartments of the electrodialysis stack and returned to the reactor. The carrier fluid 15 is continuously passed through all concentrate compartments of the electrodialysis stack and collects therein the product in the form of a lactulose-boric acid complex; the carrier fluid is partly recirculated and the product is finally obtained (at 16) as the concentrate. Simple chromatographic purification technology, applied on the concentrate, is sufficient to yield pure lactulose.

Figure 2:
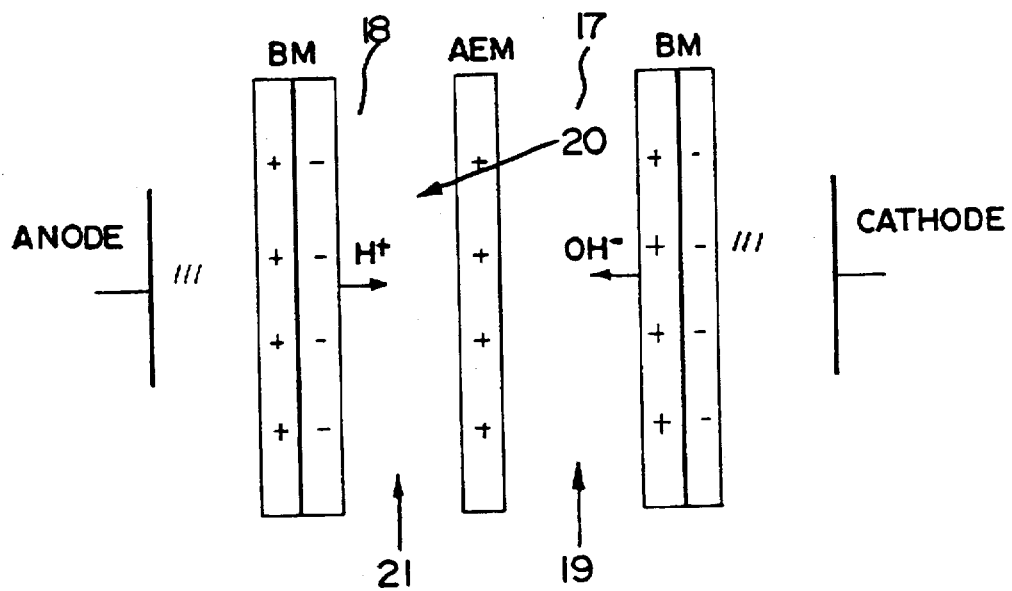
FIG. 2 is a schematic representation of a bicompartment electrodialysis cell.

In FIG. 2 a bicompartment electrodialysis cell is presented schematically. Both cathodic and anodic compartments are separated from the adjacent bicompartment cells by bipolar membranes: BM. The bicompartment cell is divided by an anion exchange membrane (AEM) into a diluate compartment 17 and a concentrate compartment 18. The diluate compartment is continuously fed (at 19) with the diluate, i.e. the alkaline aqueous solution of lactulose, lactose and boric acid. The lactulose-boric acid complex is transported (at 20) through the anion exchange membrane into the concentrate compartment, by which the diluate is now reduced in lactulose content. The carrier fluid, being enriched with the lactulose-boric acid complex and therefore called the concentrate, is passed continuously (at 21) through the concentrate compartment 18.

Figure 5:
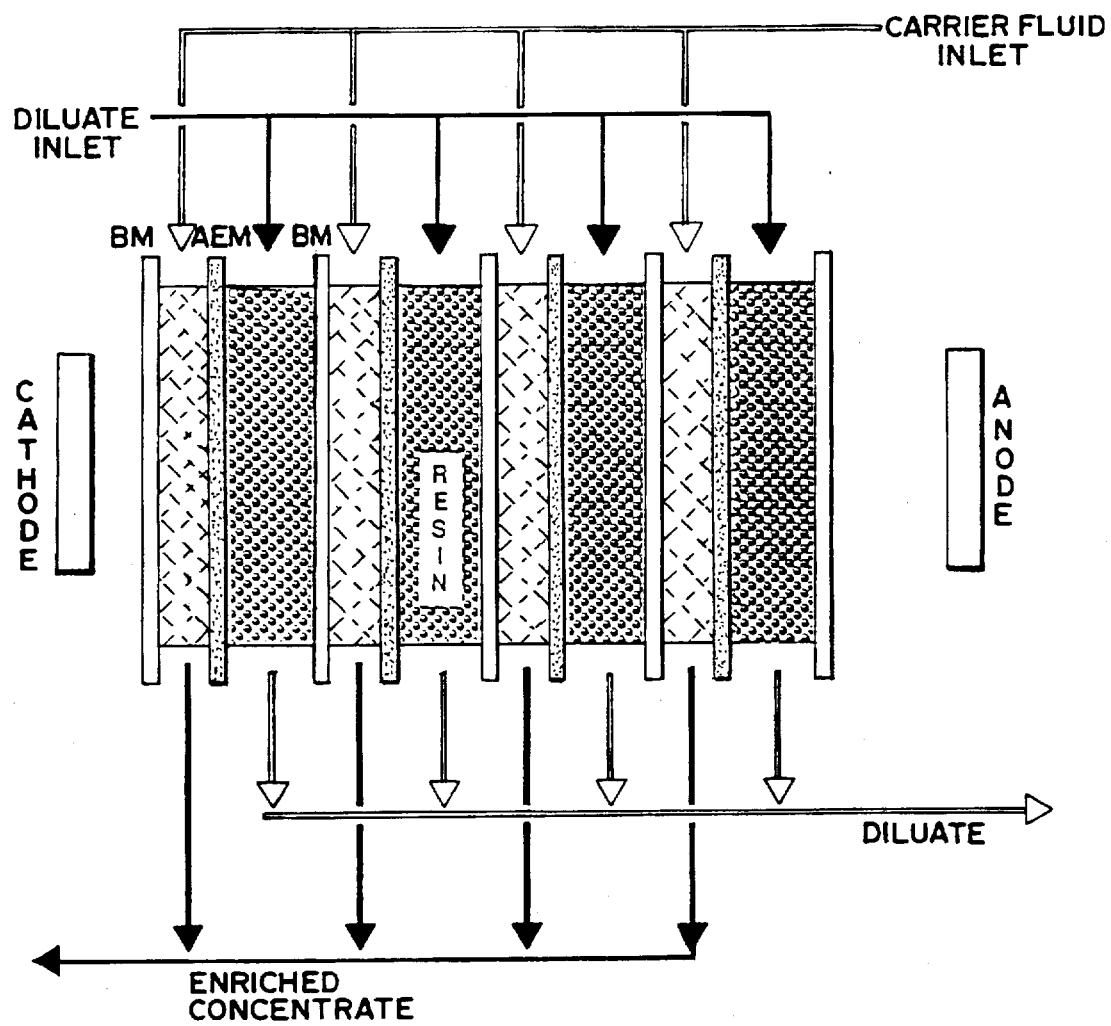
FIG. 5 is a schematic representation of a stack of a number of bicompartment electrodialysis cells in which the diluate compartment(s) are filled with an anion exchange resin.

A stack of a number of such bicompartment electrodialysis cells is schematically represented in FIG. 5. In this case the diluate compartments are filled with an anion exchange resin (Bayer MDS 3468 resin).

Example II

Figure 3:
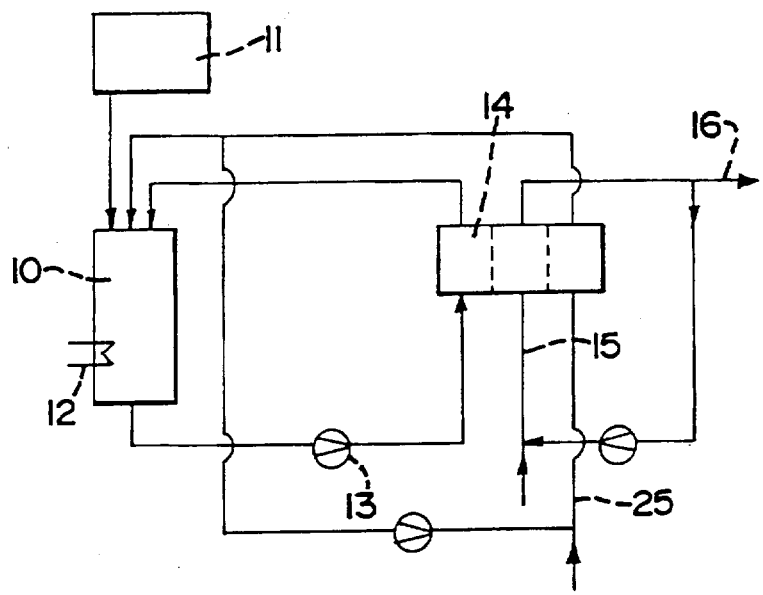
FIG. 3 is a schematic representation of a continuous electrodialytic process according to the invention using bicompartment electrodialysis cells.
Figure 4:
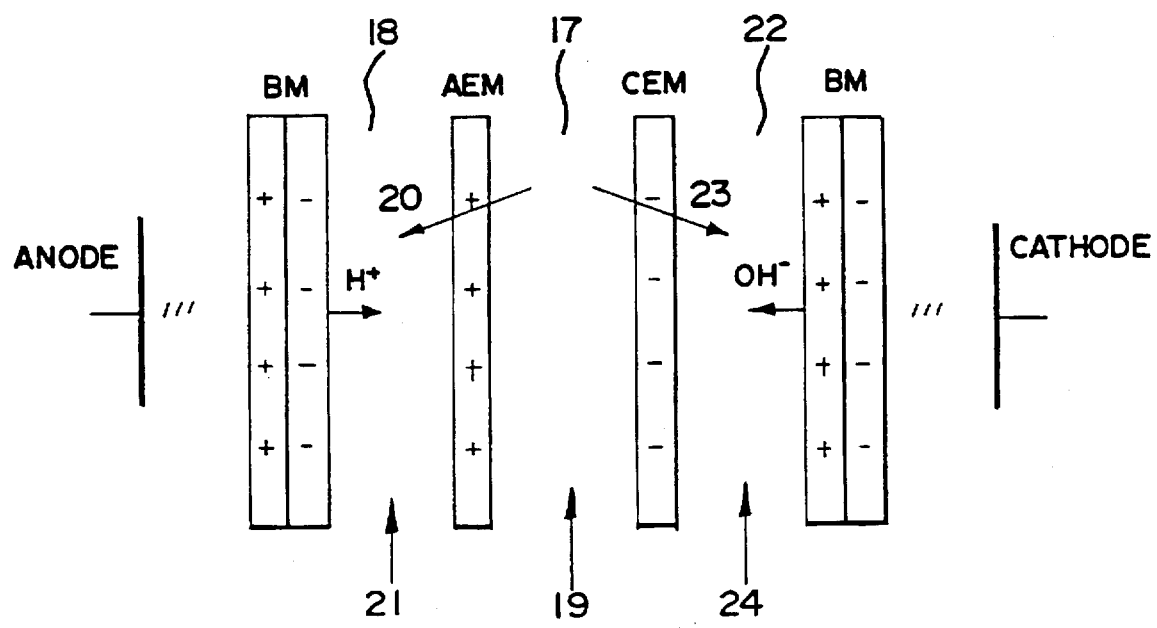
FIG. 4 is a schematic representation of a tricompartment electrodialysis cell.

Separation of lactulose in an electrodialysis equipment using tricompartment cells The principle of the continuous electrodialytic process using tricompartment cells is shown schematically in FIG. 3. Additional to the features of FIG. 1 described in Example I, in an auxiliary compartment alkali ions are collected from the diluate, by passing the fluid 25 through the auxiliary compartment, and recirculated separately to the reactor 10. In FIG. 4 a tricompartment electrodialysis cell is shown schematically, presenting an auxiliary compartment 22 adjacent to the diluate compartment 17. The auxiliary compartment is separated from the diluate compartment by a cation exchange membrane CEM, through which alkali ions are selectively transported (at 23) from the diluate into the fluid 24 continuously being passed through the auxiliary compartment. This fluid is passed through all auxiliary compartments of the electrodialysis stack, during which it is enriched with alkali ions, and is circulated to the reactor (10 in FIG. 1). In this manner the circulated stream of aqueous caustic alkali can keep the reaction mixture in the reactor at a pH of approximately 10. So in the case of the use of an electrodialysis stack comprising tricompartment cells, the scheme of FIG. 1 contains an additional circuit (loop), wherein aqueous caustic alkali is continuously recirculated by means of a pump from the reactor through the successive auxiliary compartments of the electrodialysis stack.

Example III

Separation of lactose and lactulose in an electrodialysis equipment using bicompartment cells in a stack consisting of 4 diluate and 4 concentrate compartments.

Figure 6:
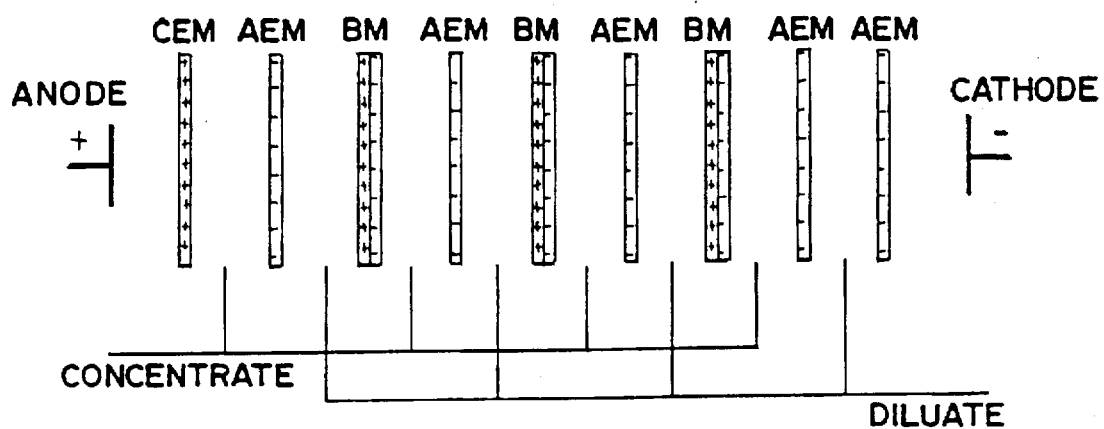
FIG. 6 is a schematic representation of a stack of bicompartment electrodialysis cells.

For an experiment of long duration a stack is used, having the configuration as depicted in FIG. 6. The distance between the membranes is 2 mm, the membrane surface is 37 $cm^2$. The volume of each cell is 7.4 $cm^3$. The bipolar membrane (BM) is of the type WSI Stantech, the anion exchange membrane (AEM) of the type RAI Pore Permion R5030-L and the cation exchange membrane (CEM) of the type Tokuyama Soda Neosepta CMX. The cathode compartment is rinsed with a 0.1 mol/l sulfuric acid solution, the anode compartment with a 0.2 mol/l sodium hydroxide solution.

To 2000 ml of a solution of 5% lactose and 0.86% boric acid in water, sodium hydroxide is added until a pH value of 10.3 is reached. The solution is heated to 60° C. and recirculated through the diluate compartments of the above mentioned stack with a speed of 1.4–1.8 ml/minute, during 10 hours. Through the concentrate compartments the concentrate is recirculated with a speed of 1.4–1.8 ml/minute, starting with 200 ml of distilled water.

Figure 7:
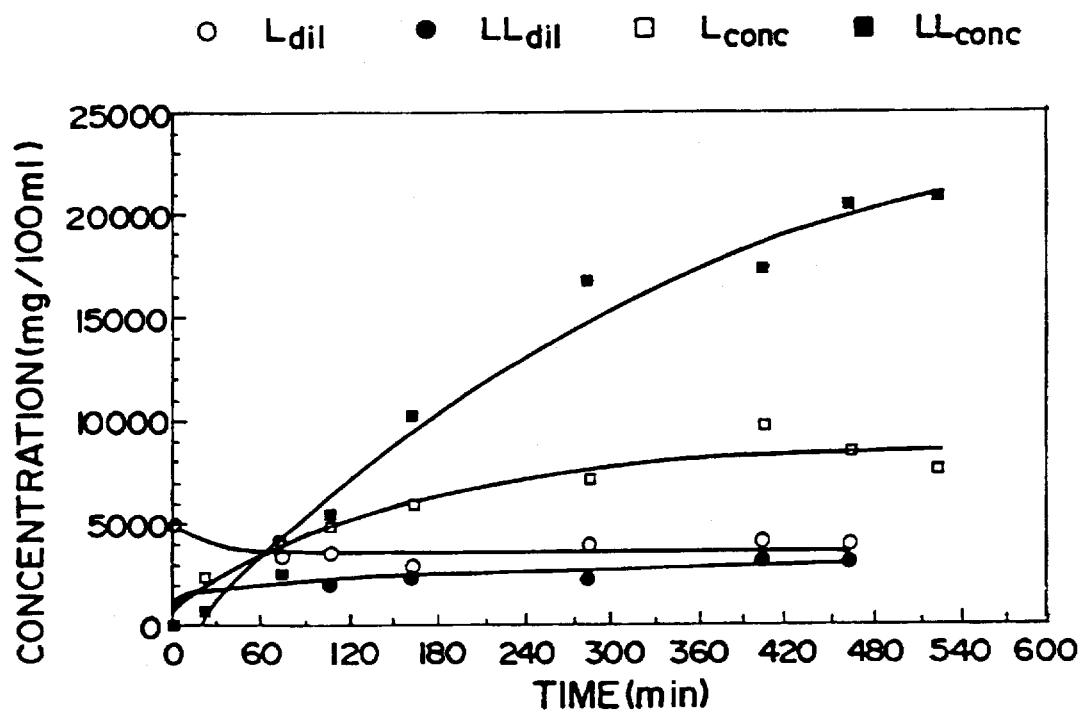
FIG. 7 is a graphic representation of the measured concentrations of lactose and lactulose, both in the diluate and concentrate.

During the experiment samples of 5 ml are collected from the concentrate and the diluate and replaced in the diluate by a solution of lactose (1 mol/1) and boric acid (1 mol/1). The measured concentrations of lactose and lactulose, both in the diluate and concentrate are depicted in FIG. 7.

I claim:

1. A process for the separation of lactulose from a mixture of lactulose and lactose in the presence of a weak acid capable of reversibly forming a complex with lactulose, by using an electrodialysis equipment including an anode and a cathode compartment separated by a plurality of parallel compartments comprising alternating diluate compartments and concentrate compartments, wherein adjacent compartments are separated from each other by permselective membranes; said process being characterized by:

(a) continuously passing an alkaline aqueous solution of lactulose, lactose and said complex forming weak acid through the diluate compartments, each diluate compartment being bound by a bipolar membrane at its lateral side facing the cathode and at its opposite lateral side by an anion exchange membrane, separating said compartment from its adjacent concentrate compartment, with the proviso that the bipolar membrane separating the cathode compartment and adjacent diluate compartment can optionally be replaced by an anion exchange membrane;

(b) continuously passing a carrier fluid through the concentrate compartments, each concentrate compartment being bound at its lateral side facing the anode by a bipolar membrane and at its opposite lateral side by said anion exchange membrane, with the proviso that the bipolar membrane separating the anode compartment and adjacent concentrate compartment can optionally be replaced by a cation exchange membrane; and (c) maintaining an electric potential between anode and cathode which transports complexed lactulose preferentially to lactose from said diluate compartments to said concentrate compartments, in order to enrich the carrier fluid with complexed lactulose.

2. A process as claimed in claim 1, characterized in that the electrodialysis equipment includes in addition a plurality of auxiliary compartments parallel situated adjacent the diluate compartments, through which auxiliary compartments an aqueous caustic alkali stream is passed continuously, each auxiliary compartment being bound by a bipolar membrane at its lateral side facing the cathode and at its opposite lateral side by a cation exchange membrane, separating this auxiliary compartment from its adjacent diluate compartment, with the proviso that the bipolar membrane separating the cathode compartment and adjacent auxiliary compartment can optionally be replaced by an anion exchange membrane.

3. A process as claimed in claim 1, characterized in that the alkaline aqueous solution of lactulose, lactose and said complex forming weak acid, passing the diluate compartments, has a pH value of approx. 9 to 10 and a temperature of approx. 60° to 70° C.

4. A process as claimed in claim 1, characterized in that the alkaline aqueous solution of lactulose, lactose and said complex forming weak acid, passing the diluate compartments, results from an approx. 20 to 40% lactose → lactulose conversion.

5. A process as claimed in claim 1, characterized in that the alkaline aqueous solution of lactulose, lactose and said complex forming weak acid, passing the diluate compartments, has a dry substance content of between 0.5 and 10%.

6. A process as claimed in claim 1, characterized in that the diluate compartments are provided with anion exchange material.

7. A process as claimed in claim 1, characterized in that said complex forming weak acid is boric acid.

* * * * *